US012683768B2

(12) United States Patent
Ozaki et al.

(10) Patent No.: US 12,683,768 B2
(45) Date of Patent: Jul. 14, 2026

(54) ENCRYPTION COMMUNICATION SYSTEM, ENCRYPTION COMMUNICATION APPARATUS, AND ENCRYPTION COMMUNICATION METHOD

(71) Applicants: KABUSHIKI KAISHA TOSHIBA, Tokyo (JP); TOSHIBA DIGITAL SOLUTIONS CORPORATION, Kawasaki (JP)

(72) Inventors: Kyouhei Ozaki, Tokyo (JP); Masakatsu Matsuo, Tokyo (JP); Manabu Kobayashi, Tokyo (JP); Koki Ando, Tokyo (JP)

(73) Assignees: KABUSHIKI KAISHA TOSHIBA, Kawasaki (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/300,519

(22) Filed: Apr. 14, 2023

(65) Prior Publication Data
US 2023/0336330 A1      Oct. 19, 2023

(30) Foreign Application Priority Data
Apr. 14, 2022     (JP) ................................. 2022-066918

(51) Int. Cl.
*H04L 9/08*          (2006.01)
(52) U.S. Cl.
CPC .......... *H04L 9/0825* (2013.01); *H04L 9/0852* (2013.01); *H04L 9/0869* (2013.01)
(58) Field of Classification Search
CPC ... H04L 9/0825; H04L 9/0852; H04L 9/0869; H04L 9/0855; H04L 9/085
See application file for complete search history.

(56) References Cited

U.S. PATENT DOCUMENTS 5,535,276 A * 7/1996 Ganesan ............... H04L 9/0825
380/46
5,937,066 A * 8/1999 Gennaro ................. H04L 9/085
380/286

(Continued)

FOREIGN PATENT DOCUMENTS

CN        111786787 A      10/2020
CN        112422283 A       2/2021

(Continued)

OTHER PUBLICATIONS

Fijiwara et al., Unbreakable distributed storage with quantum key distribution network and password-authenticated secret sharing, Scientific Reports (Year: 2016).*

(Continued)

*Primary Examiner* — David Garcia Cervetti
(74) *Attorney, Agent, or Firm* — Finnegan, Henderson, Farabow, Garrett & Dunner, LLP

(57)                    ABSTRACT

According to one embodiment, in an encryption communication system, a first device and a second device that execute encryption communication via a first network share an encryption key used for the encryption communication via a second network including a plurality of nodes. The first device generates n pieces of first data used for generating the encryption key, transmits the n pieces of first data to the second device by distributing the n pieces of first data to n nodes among the nodes and sending the n pieces of first data to the second network, and generates the encryption key by using the n pieces of first data. The second device receives the n pieces of first data from n nodes among the nodes, and generates the encryption key by using the n pieces of first data.

8 Claims, 10 Drawing Sheets

(56) References Cited

U.S. PATENT DOCUMENTS

| | | | | | |
|---|---|---|---|---|---|
| 7,515,716 | B1* | 4/2009 | Elliott | H04L 9/0858 | 380/278 |
| 7,649,996 | B2* | 1/2010 | Nishioka | H04L 9/0858 | 380/255 |
| 8,074,068 | B2* | 12/2011 | Fujii | H04L 9/085 | 713/160 |
| 8,077,863 | B2* | 12/2011 | Hosaka | H04L 9/085 | 713/160 |
| 9,356,776 | B2* | 5/2016 | Ko | H04L 9/0819 | |
| 9,667,416 | B1* | 5/2017 | Machani | H04L 9/3215 | |
| 10,171,440 | B2* | 1/2019 | Yoo | H04L 63/0876 | |
| 10,360,392 | B2* | 7/2019 | Smith | H04L 9/085 | |
| 10,437,525 | B2* | 10/2019 | Huang | G06F 3/065 | |
| 10,505,723 | B1* | 12/2019 | Griffin | H04L 9/085 | |
| 11,431,490 | B1* | 8/2022 | Ranellucci | H04L 9/50 | |
| 11,438,147 | B2* | 9/2022 | Afanasyeva | H04L 9/3252 | |
| 11,652,620 | B2* | 5/2023 | Parry | G06F 9/547 | 380/278 |
| 11,804,955 | B1* | 10/2023 | Blech | H04L 9/3213 | |
| 11,949,780 | B2* | 4/2024 | Afanasyeva | H04L 9/085 | |
| 12,250,298 | B2* | 3/2025 | Lord | H04B 10/70 | |
| 12,341,879 | B2* | 6/2025 | Takahashi | H04L 9/0855 | |
| 2003/0002674 | A1* | 1/2003 | Nambu | H04L 9/0852 | 505/202 |
| 2003/0169880 | A1* | 9/2003 | Nambu | H04L 9/0852 | 380/256 |
| 2004/0184603 | A1* | 9/2004 | Pearson | H04L 9/0855 | 380/28 |
| 2005/0111665 | A1* | 5/2005 | Ichimura | H04L 9/0855 | 380/278 |
| 2005/0228986 | A1* | 10/2005 | Fukasawa | H04L 9/3263 | 713/156 |
| 2007/0140480 | A1* | 6/2007 | Yao | H04L 9/0891 | 380/30 |
| 2007/0182968 | A1* | 8/2007 | Nishioka | H04B 10/70 | 356/491 |
| 2007/0258594 | A1* | 11/2007 | Sandhu | H04L 9/3218 | 380/277 |
| 2008/0031456 | A1* | 2/2008 | Harrison | H04L 9/0852 | 380/278 |
| 2008/0082817 | A1* | 4/2008 | Takahashi | G06F 21/31 | 713/155 |
| 2008/0095375 | A1* | 4/2008 | Tateoka | H04L 9/085 | 380/282 |
| 2008/0101612 | A1* | 5/2008 | Imai | H04L 9/0852 | 380/278 |
| 2008/0147820 | A1* | 6/2008 | Maeda | H04L 63/06 | 709/213 |
| 2008/0205637 | A1* | 8/2008 | Kurihara | H04L 9/085 | 380/28 |
| 2008/0232596 | A1* | 9/2008 | Matsukawa | H04L 9/085 | 707/999.2 |
| 2009/0077379 | A1* | 3/2009 | Geyzel | H04L 9/085 | 713/170 |
| 2009/0113267 | A1* | 4/2009 | Harrison | H03M 13/37 | 714/E11.002 |
| 2009/0262942 | A1* | 10/2009 | Maeda | H04L 9/083 | 380/278 |
| 2010/0008505 | A1* | 1/2010 | Bai | H04L 9/085 | 380/255 |
| 2010/0027794 | A1* | 2/2010 | Yuan | H04L 9/002 | 380/278 |
| 2010/0195831 | A1* | 8/2010 | Tanaka | H04L 9/0858 | 380/279 |
| 2011/0213979 | A1* | 9/2011 | Wiseman | H04L 9/0844 | 713/171 |
| 2011/0243331 | A1* | 10/2011 | Yasuda | H04L 9/0836 | 380/46 |
| 2012/0255030 | A1* | 10/2012 | Matsuo | H04L 9/085 | 726/26 |
| 2013/0163759 | A1* | 6/2013 | Harrison | H04L 9/0819 | 380/268 |
| 2014/0143443 | A1* | 5/2014 | Takahashi | H04L 45/38 | 709/241 |
| 2014/0173270 | A1* | 6/2014 | Matsuo | H04L 63/0428 | 713/150 |
| 2014/0195809 | A1* | 7/2014 | Solow | H04L 63/062 | 713/171 |
| 2014/0208116 | A1* | 7/2014 | Tanizawa | H04L 63/0428 | 713/171 |
| 2014/0233739 | A1* | 8/2014 | Grice | H04L 9/0855 | 380/278 |
| 2014/0307090 | A1* | 10/2014 | Kobayashi | H04N 21/23476 | 348/143 |
| 2014/0310527 | A1* | 10/2014 | Veugen | H04L 9/0825 | 713/150 |
| 2015/0193633 | A1* | 7/2015 | Chida | H04L 9/085 | 726/26 |
| 2015/0236852 | A1* | 8/2015 | Tanizawa | H04L 9/0858 | 380/278 |
| 2015/0270963 | A1* | 9/2015 | Tanizawa | H04L 9/0852 | 713/171 |
| 2016/0285629 | A1* | 9/2016 | Tanizawa | H04L 9/0852 | |
| 2017/0017581 | A1* | 1/2017 | Huang | G06F 21/6209 | |
| 2018/0004424 | A1* | 1/2018 | Miyamoto | G06F 3/067 | |
| 2018/0109372 | A1* | 4/2018 | Fu | H04L 9/083 | |
| 2018/0109377 | A1* | 4/2018 | Fu | H04L 63/0823 | |
| 2018/0139045 | A1* | 5/2018 | Furukawa | G06F 21/6227 | |
| 2019/0089546 | A1* | 3/2019 | Garcia Morchon | H04L 9/0847 | |
| 2019/0089687 | A1* | 3/2019 | Fiske | H04L 9/304 | |
| 2020/0044843 | A1* | 2/2020 | Mohammad | H04L 63/0435 | |
| 2020/0169418 | A1* | 5/2020 | Watanabe | H04L 63/0435 | |
| 2020/0177557 | A1* | 6/2020 | Tzur-David | H04L 63/0435 | |
| 2020/0241960 | A1* | 7/2020 | Yanovsky | G06F 11/1044 | |
| 2021/0034779 | A1* | 2/2021 | Signorini | H04L 9/3223 | |
| 2021/0083865 | A1* | 3/2021 | Obadia | H04L 9/0852 | |
| 2021/0119770 | A1* | 4/2021 | Komiyama | H04L 9/3247 | |
| 2021/0218561 | A1* | 7/2021 | Kim | H04L 9/0838 | |
| 2021/0273784 | A1* | 9/2021 | Gryb | H04L 9/085 | |
| 2021/0385079 | A1* | 12/2021 | Curty Alonso | H04L 9/085 | |
| 2021/0392003 | A1* | 12/2021 | Law | H04L 9/0897 | |
| 2022/0014367 | A1* | 1/2022 | Law | H04L 9/3271 | |
| 2022/0123928 | A1* | 4/2022 | Durak | H04L 9/0855 | |
| 2022/0164165 | A1* | 5/2022 | Marangon | G06F 7/58 | |
| 2022/0166522 | A1* | 5/2022 | Paraiso | G02B 6/4268 | |
| 2022/0172180 | A1* | 6/2022 | Komiyama | G06F 21/64 | |
| 2022/0255736 | A1* | 8/2022 | Lee | H04L 9/0852 | |
| 2022/0321333 | A1* | 10/2022 | Wissel | H04L 9/0855 | |
| 2023/0018829 | A1* | 1/2023 | Cho | H04L 9/0825 | |
| 2023/0143356 | A1* | 5/2023 | Kirsanov | G06Q 20/065 | 705/44 |
| 2023/0148242 | A1* | 5/2023 | Fujiyoshi | H04L 9/0819 | 713/171 |
| 2023/0198633 | A1* | 6/2023 | O'Brien | H04B 10/70 | 380/256 |
| 2023/0275755 | A1* | 8/2023 | Woodward | H04L 9/0852 | 713/171 |
| 2023/0299953 | A1* | 9/2023 | Doi | H04L 9/0852 | 380/255 |
| 2023/0308264 | A1* | 9/2023 | Takahashi | H04L 9/085 | |
| 2023/0318817 | A1* | 10/2023 | Sattler | H04L 9/0819 | 713/171 |
| 2023/0318818 | A1* | 10/2023 | Sinha | H04L 9/083 | |
| 2023/0336330 | A1* | 10/2023 | Ozaki | H04L 9/0825 | |
| 2023/0336336 | A1* | 10/2023 | Vacon | G06N 10/70 | |
| 2023/0388105 | A1* | 11/2023 | Kaino | H04L 9/0816 | |
| 2024/0048371 | A1* | 2/2024 | Long | H04L 9/0618 | |
| 2024/0072996 | A1* | 2/2024 | Webb | H04L 9/0819 | |
| 2024/0097893 | A1* | 3/2024 | Yeomans | H04L 9/0855 | |
| 2024/0129116 | A1* | 4/2024 | Yeomans | H04L 9/085 | |
| 2024/0163080 | A1* | 5/2024 | Von Willich | H04L 9/0819 | |
| 2024/0171386 | A1* | 5/2024 | Fujiwara | H04L 9/085 | |
| 2024/0187219 | A1* | 6/2024 | Childe | H04L 9/0861 | |
| 2024/0214192 | A1* | 6/2024 | Wen | H04L 9/0869 | |
| 2024/0235825 | A1* | 7/2024 | Sohn | H04L 9/0852 | |
| 2024/0291640 | A1* | 8/2024 | Amer | H04L 9/0819 | |
| 2024/0313949 | A1* | 9/2024 | Yeomans | H04L 9/0855 | |
| 2024/0313955 | A1* | 9/2024 | Yu | H04L 9/085 | |

(56)　　　　　References Cited

U.S. PATENT DOCUMENTS

| | | | | |
|---|---|---|---|---|
| 2024/0333487 A1* | 10/2024 | Ma | ............................ | H04L 9/40 |
| 2024/0380587 A1* | 11/2024 | Grammel | .............. | H04L 9/0852 |
| 2024/0388430 A1* | 11/2024 | Tranier | ................. | H04L 9/0869 |
| 2025/0007700 A1* | 1/2025 | Zhang | ................... | H04L 9/0852 |
| 2025/0055677 A1* | 2/2025 | Endo | ...................... | H04L 9/0852 |
| 2025/0141667 A1* | 5/2025 | Huttner | ............... | H04L 63/0442 |
| 2025/0233852 A1* | 7/2025 | Syrivelis | ............. | G06F 9/45533 |

FOREIGN PATENT DOCUMENTS

| | | | |
|---|---|---|---|
| JP | | 2011-82832 A | 4/2011 |
| JP | | 5672425 B2 | 2/2015 |
| JP | | 5685735 B2 | 3/2015 |
| JP | | 2018-502514 A | 1/2018 |
| JP | | 2023-145914 A | 10/2023 |
| WO | WO 2012/133952 A1 | | 10/2012 |
| WO | WO 2016/112086 A1 | | 7/2016 |

OTHER PUBLICATIONS

Song et al., Cryptanalysis and improvement of verifiable quantum (k, n) secret sharing, Quantum Information Processing (Year: 2016).*

Yan et al., Cheating identifiable (k, n) threshold quantum secret sharing scheme, Quantum Information Processing (Year: 2021).*

Huang et al., Communication Efficient Secret Sharing, IEEE, Dec. 2016.*

Kurihara et al., A Fast (k, L, n)-Threshold Ramp Secret Sharing Scheme, IEICE, Aug. 2009.*

Takahashi et al., Secret Sharing Scheme Suitable for Cloud Computing, IEEE, 2013.*

Lin et al., Threshold Changeable Ramp Secret Sharing, Springer, 2019.*

Kurihara et al., A New (k, n)-Threshold Secret Sharing Scheme and Its Extension, Springer, 2008.*

Japan Patent Office, Office Action in JP App. No. 2022-066918, 3 pages, and machine translation, 3 pages (Jan. 7, 2025).

* cited by examiner

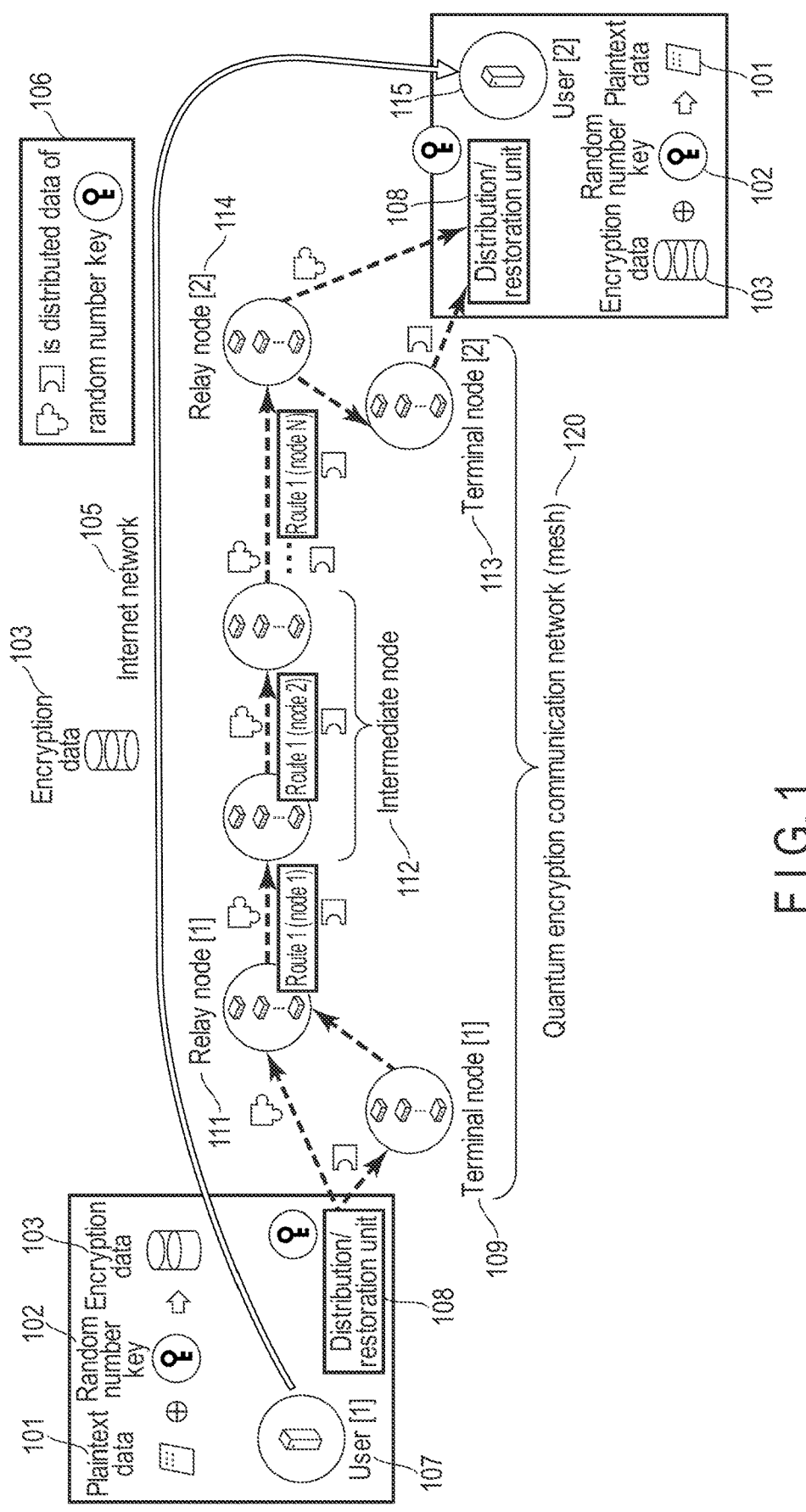
F I G. 1

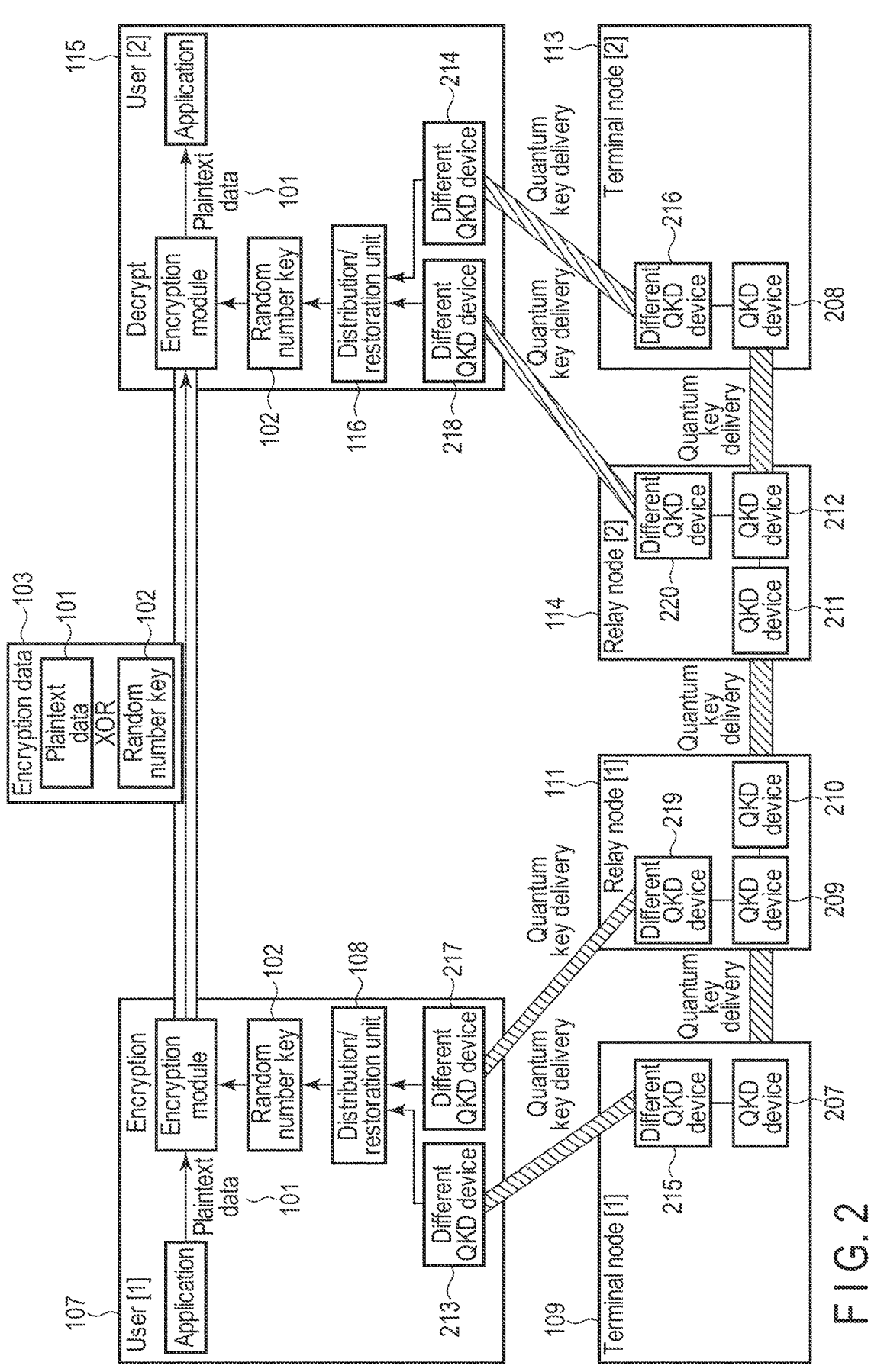
F I G. 2

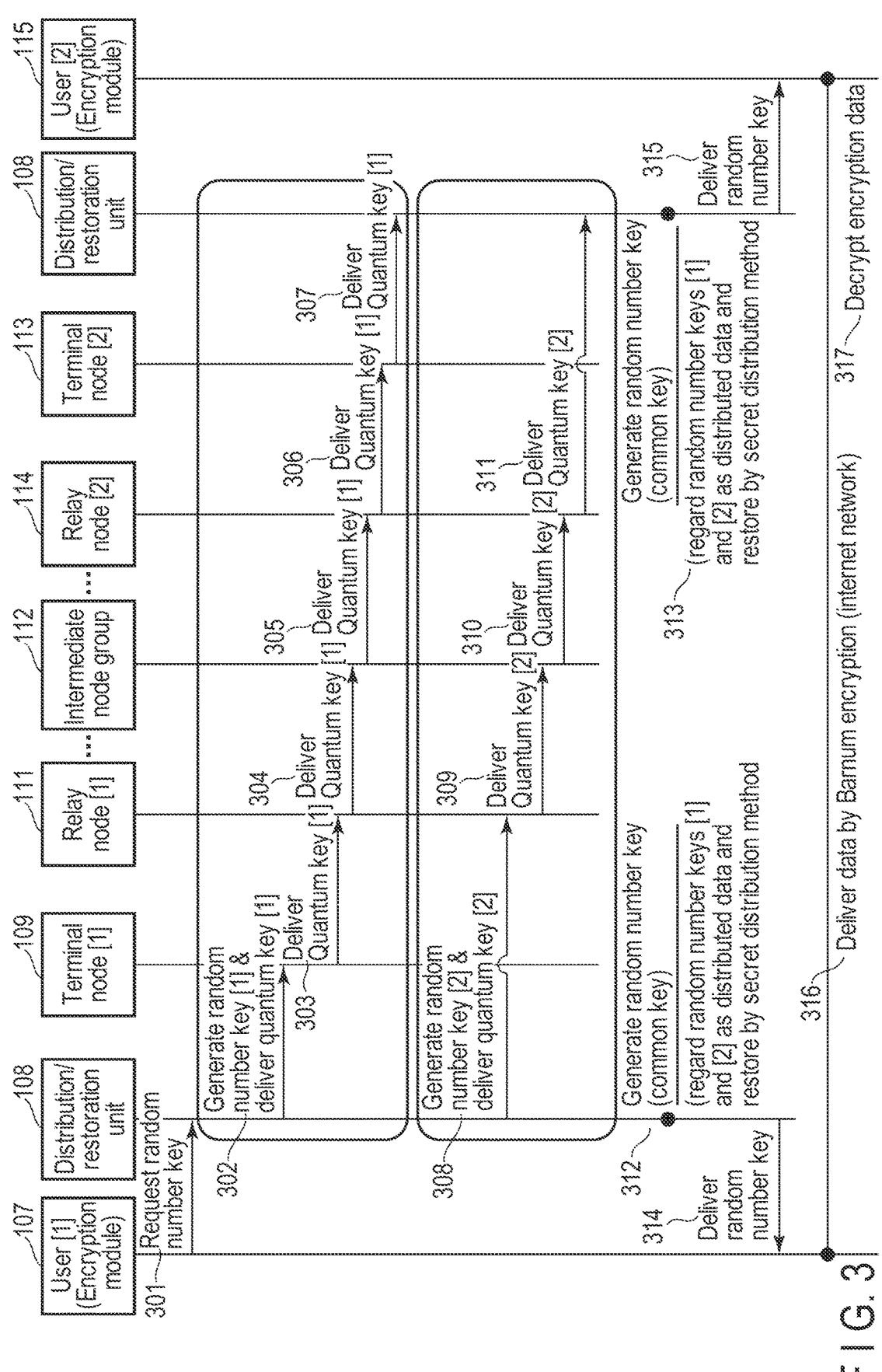
F I G. 3

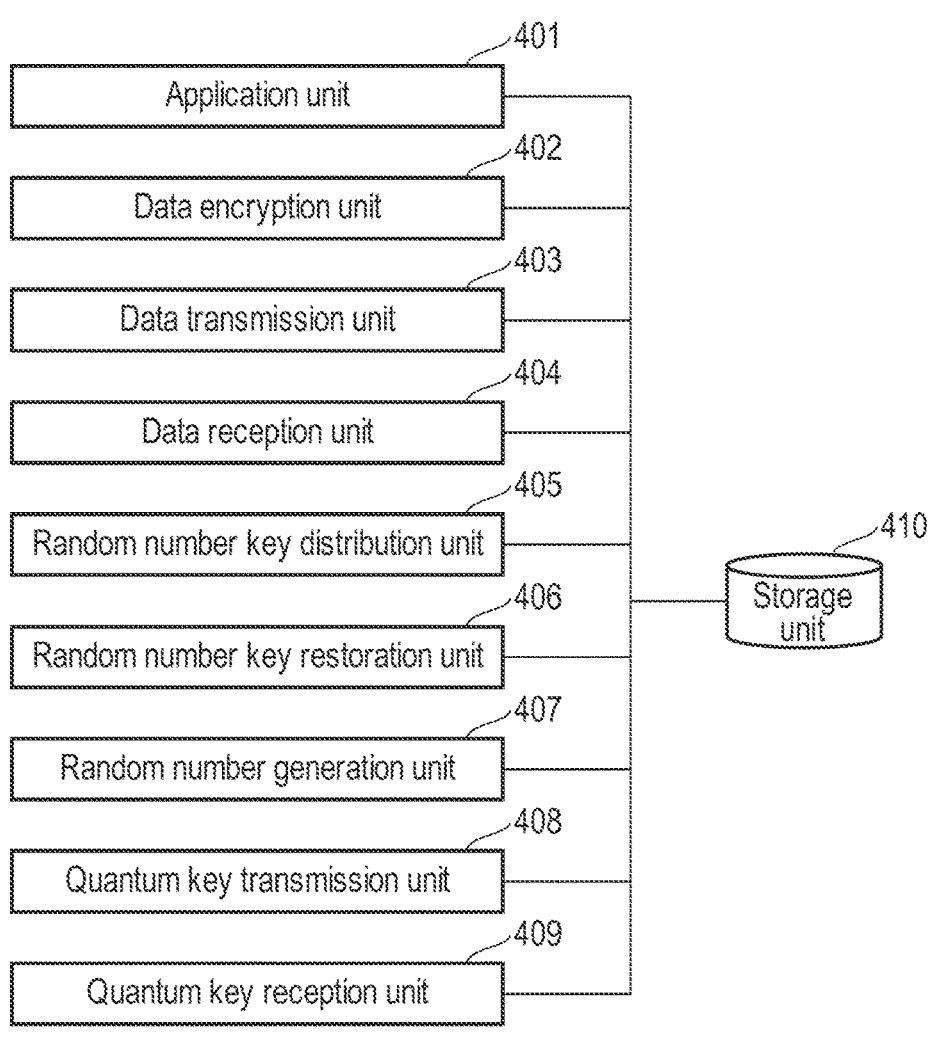

FIG. 4

401 Application unit

402 Data encryption unit

403 Data transmission unit

404 Data reception unit

405 Random number key distribution unit

406 Random number key restoration unit

407 Random number generation unit

408 Quantum key transmission unit

409 Quantum key reception unit

410 Storage unit

---

501 Random number generation unit

502 Divided key exchange unit

503 Quantum key transmission unit

504 Quantum key reception unit

505 Storage unit

FIG. 5

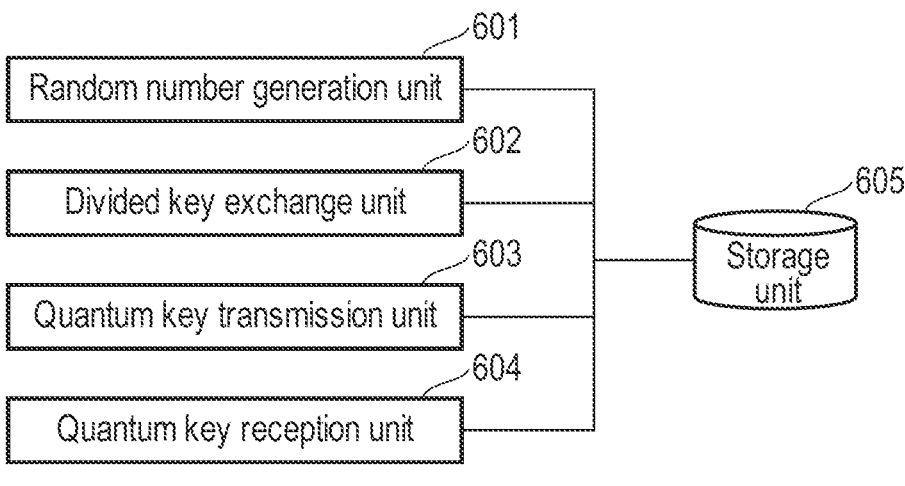
F I G. 6
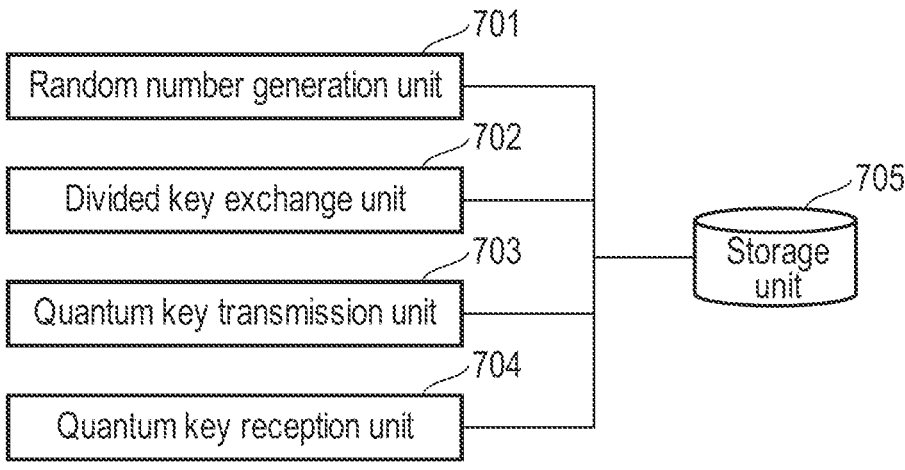
F I G. 7

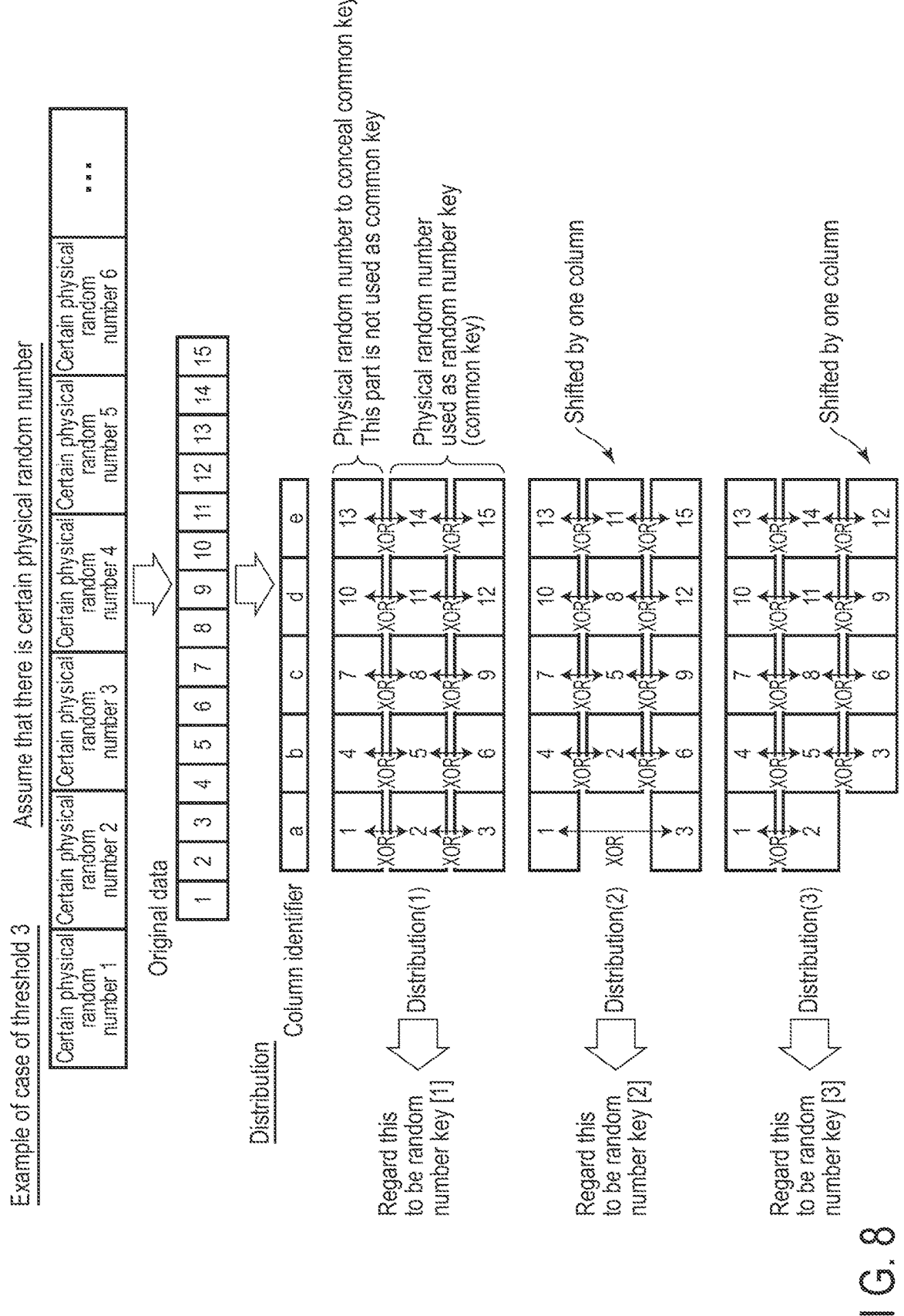
F I G. 8

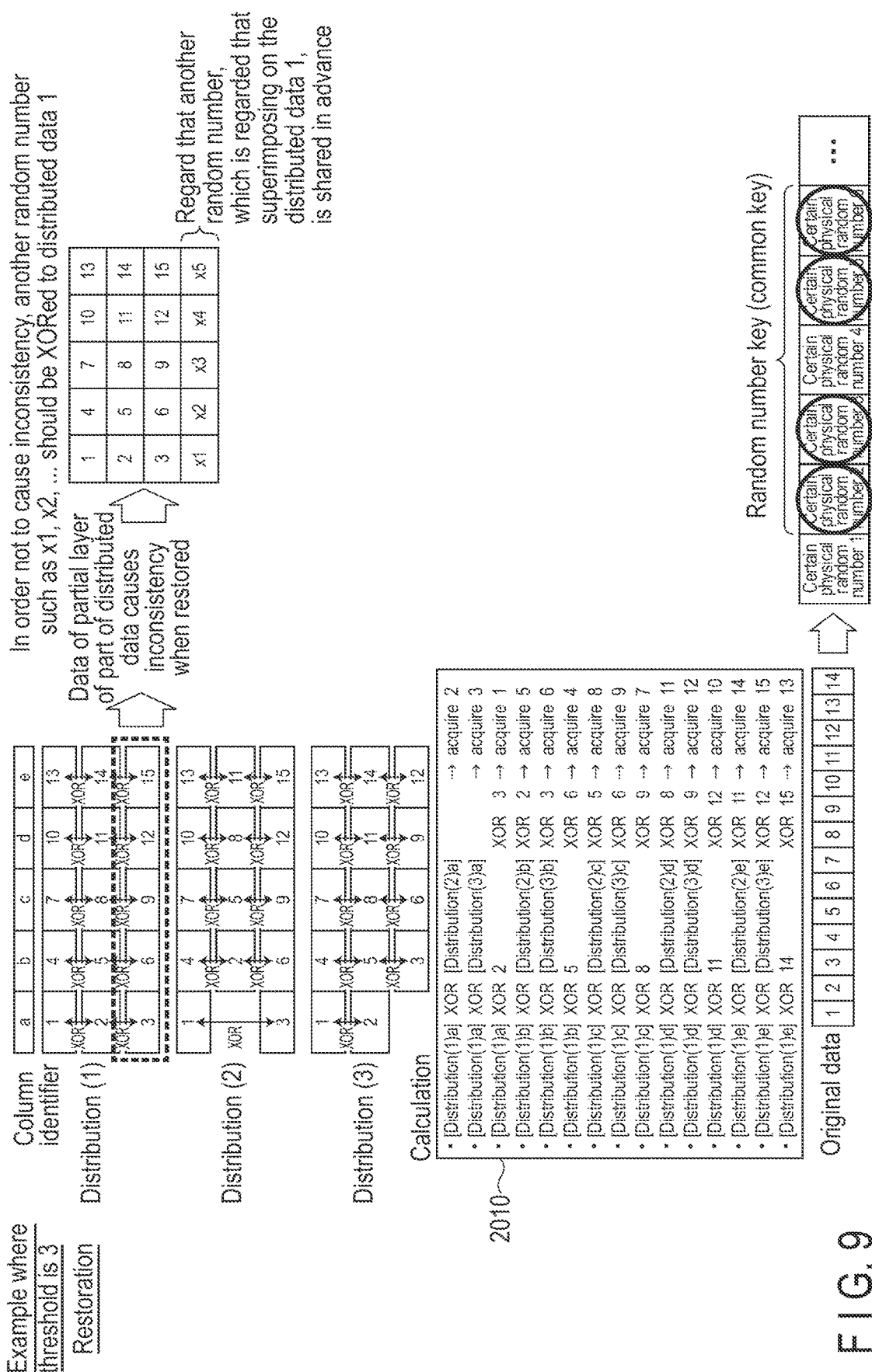
F I G. 9

Barnum encryption

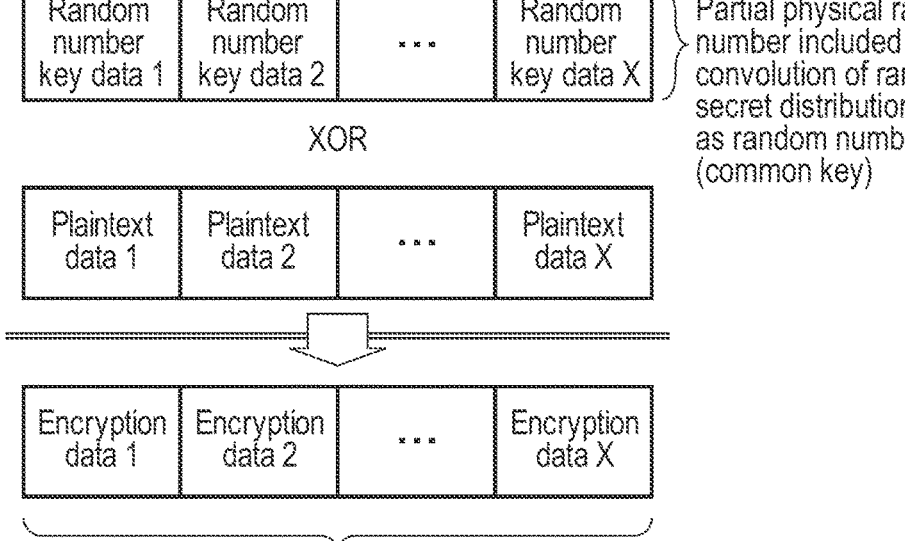

Partial physical random number included in convolution of ramp-type secret distribution is used as random number key (common key)

Impossible to be decrypted even when unauthorized eavesdropper steals part of random number keys [1] to [3]

F I G. 10

Barnum encryption

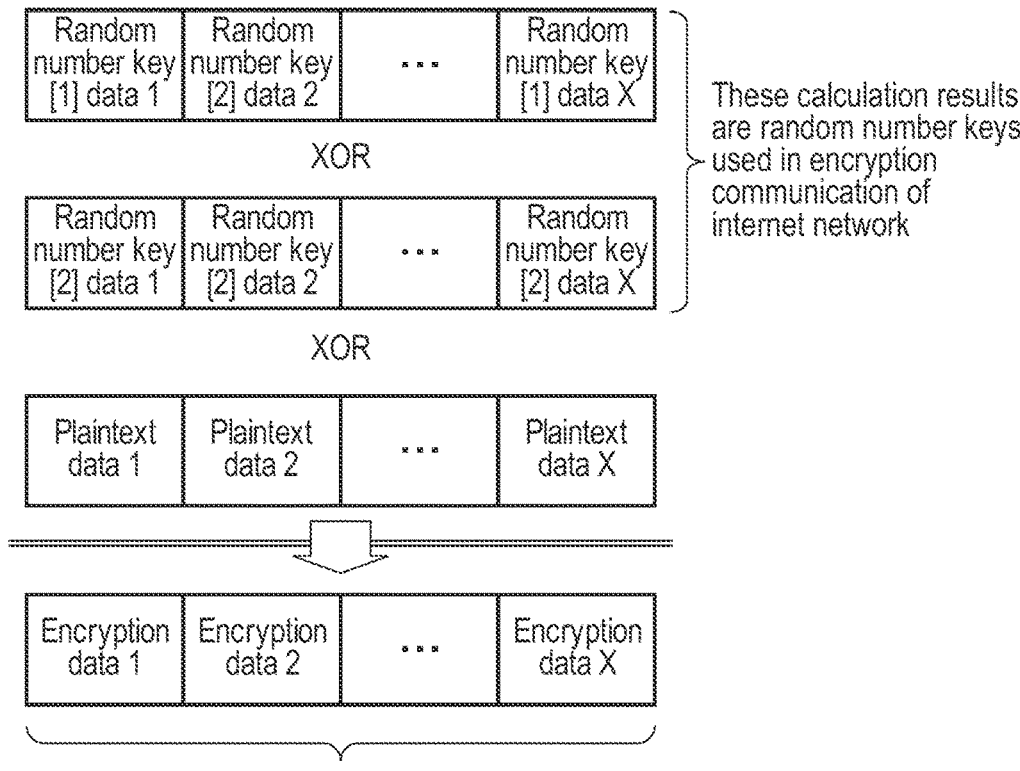

These calculation results are random number keys used in encryption communication of internet network Impossible to be decrypted even when unauthorized eavesdropper steals part of random number keys [1] and [2]

F I G. 11

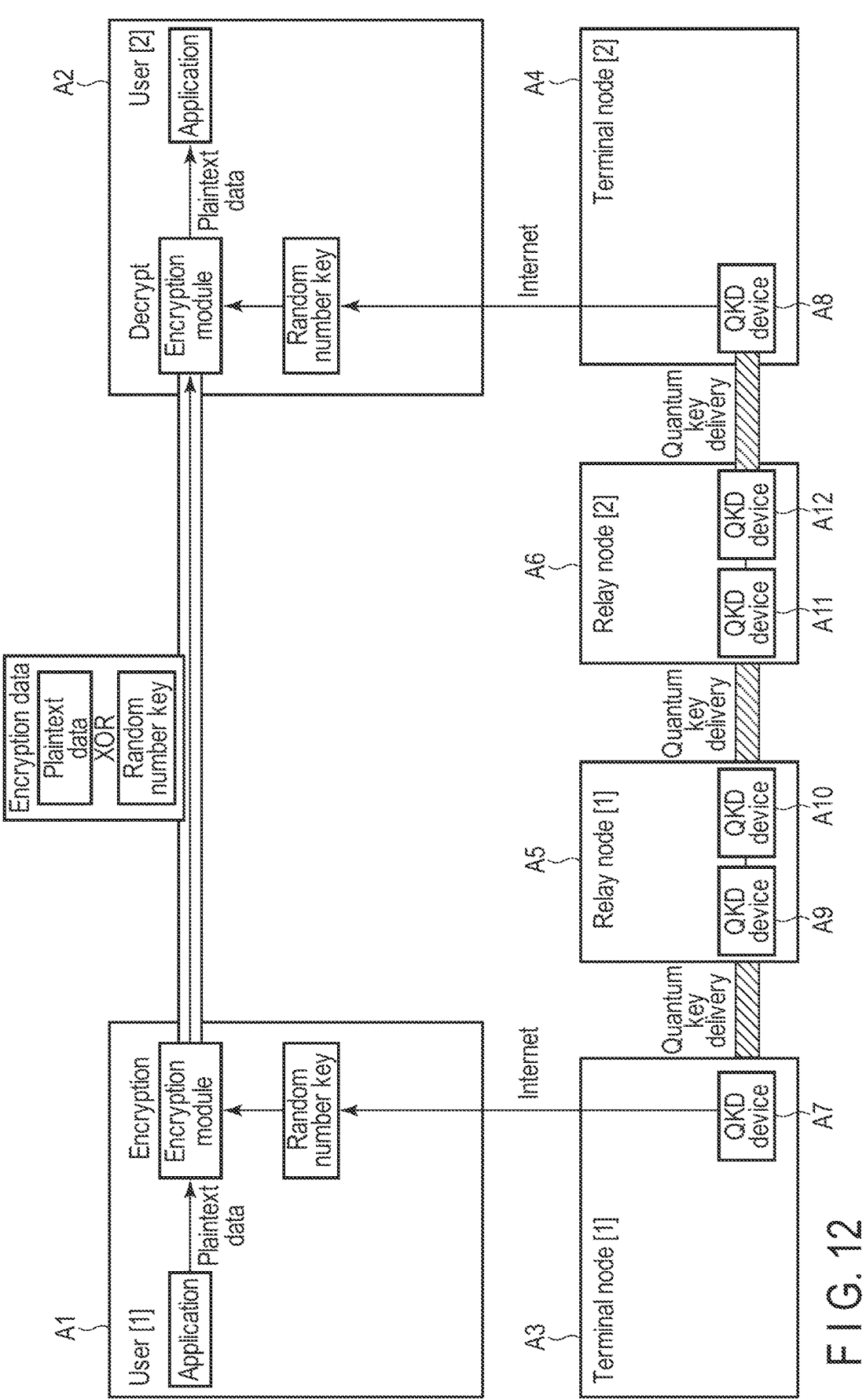
F I G. 12

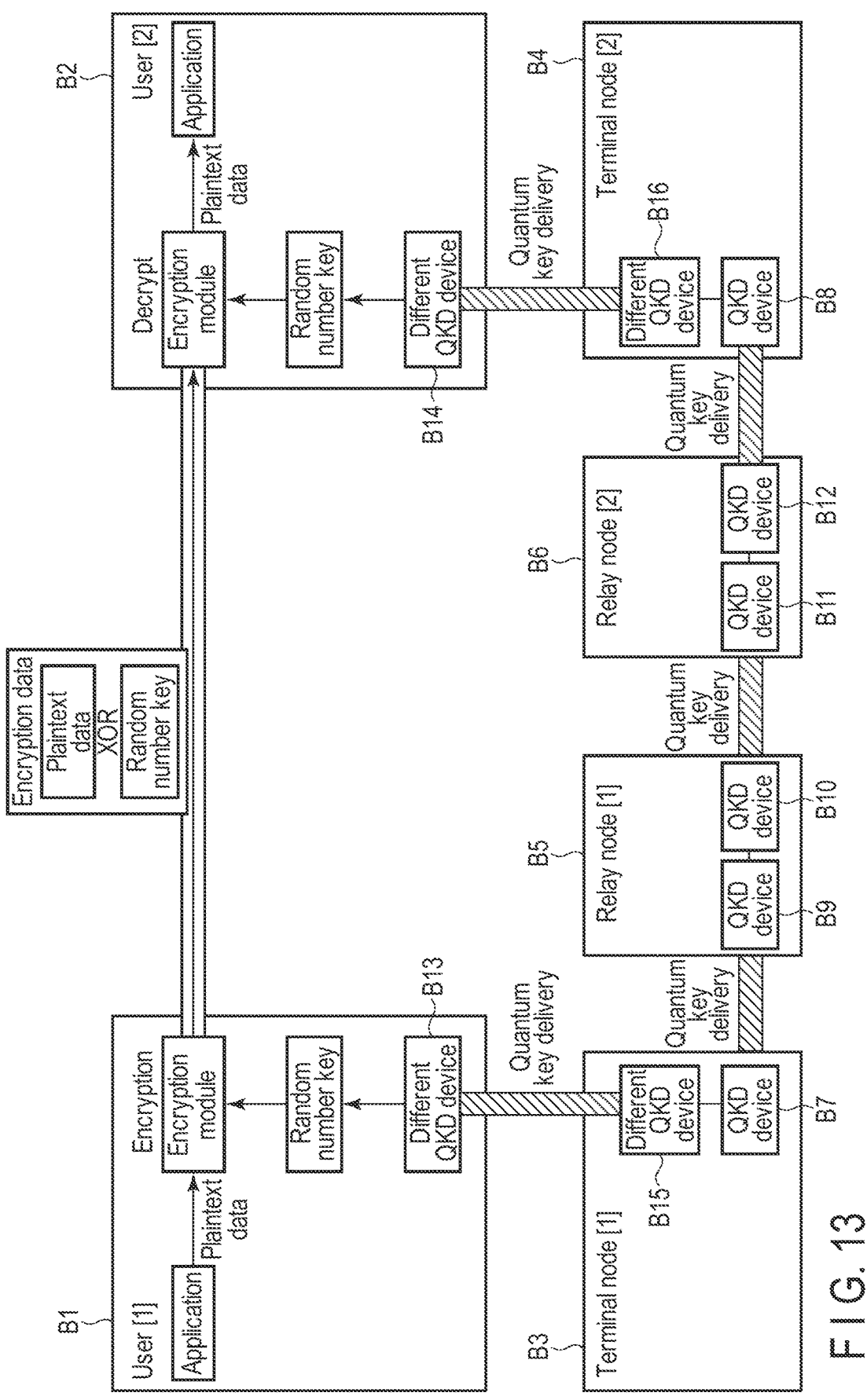
F I G. 13

ENCRYPTION COMMUNICATION SYSTEM, ENCRYPTION COMMUNICATION APPARATUS, AND ENCRYPTION COMMUNICATION METHOD

CROSS-REFERENCE TO RELATED APPLICATIONS

This application is based upon and claims the benefit of priority from Japanese Patent Application No. 2022-066918, filed Apr. 14, 2022, the entire contents of which are incorporated herein by reference.

FIELD

Embodiments described herein relate generally to an encryption communication system, an encryption communication apparatus, and an encryption communication method.

BACKGROUND

Public key encryption method currently in widespread use relies on computational security that existing computers and algorithms cannot decrypt within a valid time. In the future, when an operation of a quantum computer starts, the computational security is not guaranteed, and secure communication cannot be guaranteed by the conventional encryption method. Therefore, quantum encryption is expected as an encryption method having information theoretical security without depending on the computational security. In the quantum encryption, a distance at which a key can be directly shared is limited due to a nature of the quantum encryption using an optical cable. Therefore, by relaying the quantum encryption key by using a relay node that is reliable in terms of security, it is possible to share the encryption key (random number key) by quantum encryption and perform encryption communication between users who are distant from each other.

For example, there has been proposed an encryption communication system that suppresses degradation of encryption communication against degradation of reliability of a relay station by distributing a plurality of independent encryption keys through a plurality of different paths and performing multiplex encryption and decryption by using the encryption keys when coupled to a communication partner.

However, as illustrated in FIG. 12, in the above-described encryption communication system, although the reliability of relay node units A5 and A6 is guaranteed, there is a problem that there is a risk that the encryption key is eavesdropped over the Internet when the encryption key is delivered by QKD devices (quantum key delivery devices) A7 and A8 from a terminal node [1] A3 or a terminal node [2] A4 to a user [1] A1 as a communication source of the encryption communication or a user [2] A2 as a communication destination of the encryption communication. This is perceived as a last-one mile problem.

As a method of solving the last-one mile problem, as illustrated in FIG. 13, in addition to the QKD devices B7 and B8 (for example, BB84) that perform quantum key delivery with a relay node [1] B5 or a relay node [2] B6, disposing QKD devices (different QKD devices) B15 and B16 (for example, CVQKD) that perform quantum key delivery with a user [1] B1 and a user [2] B2 in a terminal node [1] B3 or a terminal node [2] B4 is examined. That is, it has been examined to apply quantum encryption for encrypting information (an encryption key to be delivered) with a quantum key also to communication between the user [1] B1 or the user [2] B2 and the terminal node [1] B3 or the terminal node [2] B4.

However, also in this method, there remains a problem that there is a risk that information (quantum key to be delivered) is stolen by an unauthorized person intruding into the terminal node [1] B3 or the terminal node [2] B4 and eavesdropping on data transfer between a QKD device B7 and a QKDB device (different QKD device) B15 and data transfer between a QKD device B8 and a QKDB device (different QKD device) B16.

BRIEF DESCRIPTION OF THE DRAWINGS

FIG. 1 is a diagram schematically illustrating an overall image of an encryption communication system of a first embodiment.

FIG. 2 is a block diagram illustrating an example of a configuration of the encryption communication system of the first embodiment.

FIG. 3 is a sequence chart representing a processing procedure of an encryption communication method executed by the encryption communication system of the first embodiment.

FIG. 4 is a block diagram illustrating an example of a functional configuration of a user (communication device of a user) in the encryption communication system of the first embodiment.

FIG. 5 is a block diagram illustrating an example of a functional configuration in a case where a node in a quantum encryption communication network of the encryption communication system of the first embodiment serves as a terminal node.

FIG. 6 is a block diagram illustrating an example of a functional configuration in a case where the node in the quantum encryption communication network of the encryption communication system of the first embodiment serves as a relay node.

FIG. 7 is a block diagram illustrating an example of a functional configuration in a case where the node in the quantum encryption communication network of the encryption communication system of the first embodiment serves as an intermediate node.

FIG. 8 is a first diagram illustrating an example of a method of generating a random number key by ramp-type secret distribution with a distribution number 3 and a threshold 3 in the encryption communication system of the first embodiment.

FIG. 9 is a second diagram illustrating an example of a method of generating a random number key by ramp-type secret distribution with a distribution number 3 and a threshold 3 in the encryption communication system of the first embodiment.

FIG. 10 is a diagram illustrating an example of encryption of plaintext data by a user in the encryption communication system of the first embodiment.

FIG. 11 is a diagram illustrating an example of a method of generating a random number key and encryption of plaintext data in an encryption communication system of a second embodiment.

FIG. 12 is a block diagram illustrating an example of a configuration of an encryption communication system of a first comparative example.

FIG. 13 is an example of a block diagram illustrating a configuration of an encryption communication system of a second comparative example.

DETAILED DESCRIPTION

In general, according to one embodiment, in an encryption communication system, a first device and a second device that execute encryption communication via a first network share an encryption key used for the encryption communication via a second network including a plurality of nodes. The first device generates n pieces of first data used for generating the encryption key, transmits the n pieces of first data to the second device by distributing the n pieces of first data to n nodes among the nodes and sending the n pieces of first data to the second network, and generates the encryption key by using the n pieces of first data. The second device receives the n pieces of first data from n nodes among the nodes, and generates the encryption key by using the n pieces of first data.

Hereinafter, embodiments will be described with reference to the drawings.

First Embodiment

First, a first embodiment will be described.

In the encryption communication system of the first embodiment, when one user of two users who execute encryption communication via the Internet network shares an encryption key with the other user via a quantum encryption communication network in which quantum encryption communication is performed between nodes, information necessary for generating an encryption key (hereinafter, an encryption key used in the Internet network is also referred to as a random number key) is distributed to a plurality of nodes and sent to the quantum encryption communication network addressed to the other user. The other user receives information necessary for generating the encryption key from the plurality of nodes. As a result, the encryption communication system of the first embodiment can prevent the encryption key from being stolen even when an unauthorized eavesdropper intrudes into one of the nodes (nodes in which data transfer between QKD devices occurs internally) that transmit and receive information necessary for generating the encryption key to and from the user.

FIG. 1 is a diagram schematically illustrating an overall image of the encryption communication system of the first embodiment. In the encryption communication system of the first embodiment, a user [1] 107 (communication device of the user [1] 107) and a user [2] 115 (communication device of the user [2] 115) transmitting and receiving encryption data 103 via Internet network 105 share a random number key 102 for encryption communication via a quantum encryption communication network (some sections or all sections are mesh) 120. In the quantum encryption communication network 120, a plurality of nodes each having a quantum key delivery function are coupled in a mesh shape in some sections or all sections. The mesh-like coupling does not necessarily mean that all adjacent nodes are coupled. Some adjacent nodes may not be coupled to each other. Quantum key delivery is a technique that uses quantum behavior such as photons, and generates and shares a quantum key by transmitting and receiving photons between nodes using an optical fiber as a medium, for example. Note that this quantum key is for executing encryption communication (quantum encryption communication) between two adjacent nodes over the quantum encryption communication network 120, different from the random number key 102. For this encryption communication, for example, a one time pad encryption (OTP) that cannot be decrypted with only encryption data is used.

The user [1] 107 encrypts plaintext data 101 by using the random number key 102, and transmits encryption data 103 generated by the encryption to the user [2] 115 via the Internet network 105. The user [2] 115 uses the random number key 102 to decrypt the encryption data 103 received from the user [1] 107 via the Internet network 105, and acquires the plaintext data 101.

When sharing the random number key 102 with the user [2] 115 via the quantum encryption communication network 120, the user [1] 107 generates a plurality of pieces of data (distributed data 106) necessary for generating the random number key 102 (108: division). The distributed data 106 is, for example, a simple random number. Note that the user [1] 107 includes a QKD device for performing quantum key delivery with a node (terminal node [1] 109, relay node [1] 111) in the quantum encryption communication network 120, and an encryption key generated by the QKD device may be diverted as the distributed data 106. The encryption key generated by the QKD device is used by the user [1] 107 for encryption communication with a node in the quantum encryption communication network 120, and is not the random number key 102 used for encryption communication with the user [2] 115.

The QKD device included in the user [1] 107 is, for example, an inexpensive QKD device with a lower specification than a QKD device for quantum key delivery executed by each node in the quantum encryption communication network 120 with the another node. Similarly to the user [1] 107, the user [2] 115 also includes a QKD device for performing quantum key delivery with a node (terminal node [2] 113, relay node [2] 114) in the quantum encryption communication network 120.

The user [1] 107 distributes the plurality of pieces of distributed data 106 to a plurality of nodes (terminal node [1] 109, relay node [1] 111) and sends the distributed data to the quantum encryption communication network 120. The plurality of pieces of distributed data 106 is divided into a plurality of nodes (terminal node [2] 113, relay node [2] 114) after passing through the intermediate node 112, and is transmitted from each branch destination to the user [2] 115.

Note that each node in the quantum encryption communication network 120 can be a terminal node, a relay node, or an intermediate node.

Each of the user [1] 107 who is a transmission source of the distributed data 106 and the user [2] 115 who is a transmission destination of the distributed data 106 regards the plurality of pieces of distributed data 106 which are actually simple random numbers as, for example, data generated by distribution processing by a secret distribution method, and executes restoration processing by the secret distribution method by using an exclusive OR or the like (108: restoration). The user [1] 107 and the user [2] 115 acquire the data obtained by the restoration processing as the random number key 102, or generate the random number key 102 based on the data. Details of the generation of the random number key 102 using the distributed data 106 will be described later. The random number key 102 generated by the user [1] 107 and the random number key 102 generated by the user [2] 115 are the same. That is, the random number key 102 is an encryption key shared between the user [1] 107 and the user [2] 115 via the quantum encryption communication network 120.

Next, with reference to FIG. 2, a mechanism in which the encryption communication system of the first embodiment prevents theft of the random number key 102 used for the encryption communication executed between the user [1] 107 and the user [2] 115 will be described in detail.

Here, it is assumed that an application program on the user [1] 107 transmits data to an application program on the user [2] 115. Data output by the application program on the user [1] 107 and data input by the application program on the user [2] 115 are the above-described plaintext data 101.

The plaintext data 101 output by the application program on the user [1] 107 is encrypted into encryption data 103 by an encryption module and transferred to a user [2] 114 via the Internet network 105. On the other hand, in the user [2] 114 who has received the encryption data 103, the encryption module decrypts the encryption data 103 into the plaintext data 101, and the plaintext data 101 is input to the application program.

The same random number key 102 is used for encryption by the encryption module in the user [1] 107 and decryption by the encryption module in the user [2] 115. The user [1] 107 and the user [2] 114 share the random number key 102 via the quantum encryption communication network 120.

Each node (terminal node [1] 109, relay node [1] 111, relay node [2] 114, and terminal node [2] 113) in the quantum encryption communication network 120 includes a QKD device (207, 209, 210, 211, 212, and 208) for performing quantum key delivery with other nodes. That is, the security is secured for encryption communication between two nodes in the quantum encryption communication network 120.

In addition, the user [1] 107 and the terminal node [1] 109 that performs encryption communication with the user [1] 107 include QKD devices (different QKD devices) 213 and 215 for performing quantum key delivery. Therefore, security is also secured for encryption communication between the user [1] 107 and the terminal node [1] 109.

However, since data is exchanged between the different QKD device 215 and the QKD device 207 in the terminal node [1] 109, when an unauthorized eavesdropper intrudes into the terminal node [1] 109, data may be stolen at the time of data exchange between the different QKD device 215 and the QKD device 207. Therefore, when the user [1] 107 sends the random number key 102 itself to the user [2] 115 via the terminal node [1] 109 to the quantum encryption communication network 120, the random number key 102 may be stolen. This problem similarly exists in the terminal node [2] 113 in which data is exchanged between the QKD device 208 and a different QKD device 216.

Therefore, in the encryption communication system of the first embodiment, the user [1] 107 generates, for example, two pieces of data (distributed data 106) necessary for generating the random number key 102, distributes the generated data to the terminal node [1] 109 and the relay node [1] 111, and sends the data to the quantum encryption communication network 120 toward the user [2] 115. Alternatively, the user [1] 107 regards the two pieces of distributed data 106, which are actually simple random numbers, as the data obtained by the distribution processing by the secret distribution method, distributes the data to the terminal node [1] 109 and the relay node [1] 111, and sends the data to the quantum encryption communication network 120 toward the user [2] 115. In this case, a distribution/restoration unit 108 executes restoration processing by the secret distribution method to acquire the random number key 102, or generates the random number key 102 based on data obtained by the restoration processing.

Note that for internal data exchange between the QKD devices in each node for quantum key delivery in the quantum encryption communication network 120, such as data exchange between the QKD device 209 and the QKD device 210 in the relay node [1] 111, for example, it is assumed that some confidentiality protection measure is separately performed. Here, the method is not limited.

When the user [1] 107 starts sharing the random number key 102 with the user [2] 115 via the quantum encryption communication network 120, a path (route) is formed over the quantum encryption communication network 120 such that the two pieces of distributed data 106 from the two nodes in the quantum encryption communication network 120 are separately passed to the user [2] 115. Note that a certain node may be redundantly interposed on the routes of the two pieces of distributed data 106 (between the relay node [1] 111 and the relay node [1] 114).

On the other hand, the user [2] 115 who has received the two pieces of distributed data 106 from the user [1] 107 via the quantum encryption communication network 120 executes the restoration processing of the two pieces of distributed data 106 by the secret distribution method to acquire the random number key 102, or generates the random number key 102 based on the data obtained by the restoration processing.

As a result, for example, even when an unauthorized eavesdropper intrudes into the terminal node [1] 109 and steals the distributed data 106 that is exchanged between the different QKD device 215 and the QKD device 207, the random number key 102 cannot be generated without the distributed data 106 transmitted to the relay node [1] 111 side, and thus the random number key 102 is protected. The same applies to the relay node [2] 114 and the terminal node [2] 113 on the user [2] 115 side.

That is, the encryption communication system of the first embodiment can prevent the encryption key from being stolen even when an unauthorized eavesdropper intrudes into adjacent nodes (109, 113) that transmit and receive information necessary for generating the random number key 102 to and from the users (107, 115).

FIG. 3 is a sequence chart representing a processing procedure of the encryption communication method executed by the encryption communication system of the first embodiment.

The encryption module of the user [1] 107 requests the random number key 102 from the distribution/restoration unit 108 (301). The distribution/restoration unit 108 that has received this request generates a first random number key [1] (distributed data 106) and performs quantum key delivery to the terminal node [1] 109 (302). Note that the quantum key delivery here is to transmit and receive the distributed data 106 by encryption communication using the quantum key shared between the different QKD device 213 and the different QKD device 215. Note that the generation of the random number key may be generation of a quantum key by the quantum key delivery function.

The terminal node [1] 109 performs quantum key delivery of the random number key [1] received from the distribution/restoration unit 108 of the user [1] 107 to the relay node [1] 111 (303). The relay node [1] 111 performs quantum key delivery of the random number key [1] to the intermediate node 112 (intermediate node 112 adjacent over the quantum encryption communication network 120) (304). The random number key [1] is subjected to quantum key delivery in the section of the intermediate node 112, passes through the relay node [2] 114 (305), and is subjected to quantum key delivery to the terminal node [2] 113 (306). The terminal node [2] 113 performs quantum key delivery of the random number key [1] to a distribution/restoration unit 116 of the user [2] 115 (307).

Furthermore, the distribution/restoration unit 108 of the user [1] 107 generates a second random number key [2] (distributed data 106) and performs quantum key delivery to the relay node [1] 111 (not to the terminal node [1] 109) (308). The relay node [1] 111 performs quantum key delivery of the random number key [2] to the intermediate node 112 (309). The random number key [1] is subjected to quantum key delivery in the section of the intermediate node 112 and subjected to quantum key delivery to the relay node [2] 114 (not to the terminal node [2] 113) (310). The relay node [2] 114 performs quantum key delivery of the random number key [2] to the distribution/restoration unit 116 of the user [2] 115 (311).

The distribution/restoration unit 108 of the user [1] 107 regards the two random number keys [1 and 2] as, for example, data obtained by distribution processing by secret distribution, and executes restoration processing by secret distribution using the two random number keys [1 and 2] to acquire a random number key, or generates a random number key based on the data obtained by the restoration processing (312). This random number key is the above-described random number key 102 used by the encryption module of the user [1] 107 to encrypt the plaintext data 101 into the encryption data 103.

On the other hand, the distribution/restoration unit 116 of the user [2] 115 also executes the restoration processing by the secret distribution on the two random number keys [1 and 2] to acquire the random number key, or generates the random number key based on the data obtained by the restoration processing (313). This random number key is the above-described random number key 102 used by the encryption module of the user [2] 115 to decrypt the encryption data 103 into the plaintext data 101. The random number key 102 on the user [1] 107 side and the random number key 102 on the user [2] 115 side are the same.

The distribution/restoration unit 108 of the user [1] 107 delivers the generated or acquired random number key 102 to the encryption module (314), while the distribution/restoration unit 108 of the user [2] 115 also delivers the generated random number key 102 to the encryption module (315). The encryption module of the user [1] 107 encrypts the plaintext data 101 by using the received random number key 102 and transmits the encryption data 103 to the user [2] 115 via the Internet network 105 (316). On the other hand, the encryption module of the user [2] 115 decrypts the encryption data 103 received from the user [1] 107 via the Internet network 105 into the plaintext data 101 by using the random number key 102 received from the distribution/restoration unit 108 (317).

FIG. 4 is a block diagram illustrating an example of a functional configuration of the user (107, 115) in the encryption communication system of the first embodiment.

The user includes data processing function units of an application unit 401, a data encryption unit 402, a data transmission unit 403, a data reception unit 404, a random number key distribution unit 405, a random number key restoration unit 406, a random number generation unit 407, a quantum key transmission unit 408, and a quantum key reception unit 409, and a storage function unit of a storage unit 410. The data processing function unit may be implemented by a central processing unit (CPU) executing a program, or may be implemented as hardware such as an electric circuit. Various storage apparatuses such as a hard disk drive (HDD) and a solid state drive (SSD) can be applied as the storage function unit.

The application unit 401 is a program that transmits and receives plaintext data 101 to and from an application unit 401 of an opposing user.

The data encryption unit 402 encrypts the plaintext data 101 received from the application unit 401 by using an encryption key generated by the random number key restoration unit 406 to generate encryption data 103, or decrypts the encryption data 103 received by the data reception unit 404 to acquire the plaintext data 101.

The data transmission unit 403 transmits the encryption data 103 generated by the encryption of the data encryption unit 402 to the opposing user. On the other hand, the data reception unit 404 receives the encryption data 103 from the opposing user.

The random number key distribution unit 405 generates a plurality of pieces of distributed data 106 which are information necessary for generating the random number key 102. Note that the distributed data 106 generated by the random number key distribution unit 405 may be a simple random number such as a quantum key. Therefore, the role of the random number key distribution unit 405 may be performed by the random number generation unit 407, the quantum key transmission unit 408, or the quantum key reception unit 409.

The random number key restoration unit 406 executes restoration processing by the secret distribution method on the distributed data 106 generated by the random number key distribution unit 405. The random number key restoration unit 406 acquires the random number key 102 by this restoration processing, or generates the random number key 102 based on data obtained by the restoration processing.

The random number generation unit 407 generates a random number (quantum key) used for quantum key delivery with the terminal node (109 and 113) or the relay node (111 and 114). Note that the generation of the random number (quantum key) may be executed by the quantum key transmission unit 408 or the quantum key reception unit 409.

The quantum key transmission unit 408 transmits the distributed data 106 to the terminal node (109) and the relay node (111). On the other hand, the quantum key reception unit 409 receives the distributed data 106 from the terminal node (113) and the relay node (114).

The storage unit 410 stores various data including the plaintext data 101, the random number key 102, the encryption data 103, the distributed data 106, and the random number (quantum key). The various data are erased from the storage unit 410 at appropriate times.

FIG. 5 is a block diagram illustrating an example of a functional configuration in a case where a node in the quantum encryption communication network 120 of the encryption communication system of the first embodiment serves as a terminal node (109 and 113).

The terminal node includes data processing function units of a random number generation unit 501, a divided key exchange unit 502, a quantum key transmission unit 503, and a quantum key reception unit 504, and a storage function unit of a storage unit 505.

The random number generation unit 501 generates a random number (quantum key) used for quantum key delivery. For a terminal node, a random number (quantum key) for encryption communication with a user and a quantum key for encryption communication with a relay node are generated. Note that the generation of the random number (quantum key) may be executed by the quantum key transmission unit 503 or the quantum key reception unit 504.

The divided key exchange unit 502 executes internal exchange of the distributed data 106 between the QKD devices [different QKD devices] (215, 216) for encryption communication with the user and the QKD device (207, 208) for encryption communication with the relay node.

The quantum key transmission unit 503 transmits the distributed data 106 to the user or the relay node. Transmission of the distributed data 106 to the user is executed by the QKD device [different QKD device] (216) and transmission of the distributed data 106 to the relay node is executed by a QKD device (207).

The quantum key reception unit 504 receives the distributed data 106 from the user or the relay node. The reception of the distributed data 106 from the user is performed by the QKD device [different QKD device] (215), and the reception of the distributed data 106 from the relay node is performed by the QKD device (208).

The storage unit 505 stores various data including the distributed data 106 and a random number (quantum key). The various data are erased from the storage unit 505 at appropriate times.

FIG. 6 is a block diagram illustrating an example of a functional configuration in a case where a node in the quantum encryption communication network 120 of the encryption communication system of the first embodiment serves as a relay node (111, 114).

The relay node includes data processing function units of a random number generation unit 601, a divided key exchange unit 602, a quantum key transmission unit 603, and a quantum key reception unit 604, and a storage function unit of a storage unit 605.

The random number generation unit 601 generates a random number (quantum key) used for quantum key delivery. For the relay node, a random number (quantum key) for encryption communication with the user, a random number (quantum key) for encryption communication with the terminal node, and a random number (quantum key) for encryption communication with the intermediate node are generated. Note that the generation of the random number (quantum key) may be executed by the quantum key transmission unit 603 or the quantum key reception unit 604.

The divided key exchange unit 602 executes internal exchange of the distributed data 106 between a QKD device [different QKD device] (219, 220) for encryption communication with the user and the QKD device (209, 208) for encryption communication with the terminal node. In addition, the divided key exchange unit 602 executes internal exchange of the distributed data 106 between the QKD device (209, 212) for encryption communication with the terminal node and the QKD device (210, 211) for encryption communication with the intermediate node. In FIG. 2, for the sake of simplicity, intermediate nodes interposed between two relay nodes are not illustrated.

The quantum key transmission unit 603 transmits the distributed data 106 to a user, a terminal node, or an intermediate node. Transmission of the distributed data 106 to the user is executed by the QKD device [different QKD device] (220) and transmission of the distributed data 106 to the terminal node or the intermediate node is executed by the QKD device (212, 210).

The quantum key reception unit 604 receives the distributed data 106 from a user, a terminal node, or an intermediate node. The reception of the distributed data 106 from the user is executed by the QKD device [different QKD device] (219) and the reception of the distributed data 106 from the terminal node or the intermediate node is executed by the QKD device (209, 211).

The storage unit 605 stores various data including the distributed data 106 and a random number (quantum key). The various data are erased from the storage unit 605 at appropriate times.

FIG. 7 is a block diagram illustrating an example of a functional configuration in a case where a node in the quantum encryption communication network 120 of the encryption communication system of the first embodiment serves as an intermediate node (112).

The intermediate node includes data processing function units of a random number generation unit 701, a divided key exchange unit 702, a quantum key transmission unit 703, and a quantum key reception unit 704, and a storage function unit of a storage unit 705.

The random number generation unit 701 generates a random number (quantum key) used for quantum key delivery. For the intermediate node, a random number (quantum key) for encryption communication with the relay node and a random number (quantum key) for encryption communication with another intermediate node are generated. Note that the generation of the random number (quantum key) may be executed by the quantum key transmission unit 703 or the quantum key reception unit 704.

The divided key exchange unit 702 executes internal exchange of the distributed data 106 between two QKD devices for encryption communication with a relay node or the another intermediate node.

The quantum key transmission unit 703 transmits the distributed data 106 to a relay node or another intermediate node. On the other hand, the quantum key reception unit 704 receives the distributed data 106 from the relay node or the another intermediate node.

The storage unit 705 stores various data including the distributed data 106 and a random number (quantum key). The various data are erased from the storage unit 705 at appropriate times.

Here, a method of generating the random number key 102 by the user (107, 115) in the encryption communication system of the first embodiment will be described with reference to FIGS. 8 and 9.

FIG. 8 is a first diagram illustrating an example of a method of generating a random number key 102 by the user (107, 115) in the encryption communication system of the first embodiment. Here, a case where the random number key 102 is generated by the ramp-type secret distribution (this example is a (threshold K=3, L=2, and distribution number N=3) ramp-type secret distribution) with the distribution number 3 and the threshold 3 will be described as an example. In this case, the user 107 preferably sends three pieces of distributed data 106 to the quantum encryption communication network 120 via different nodes respectively. In addition, the user 115 preferably receives the three pieces of distributed data via different nodes respectively.

In the case of the ramp-type secret distribution, even when one of the three pieces of distributed data 106 is eavesdropped, restoration cannot be performed. Furthermore, here, it is assumed that a ratio between a random number (dummy data, that is, a physical random number to be discarded) and a plaintext (here, a physical random number used as a common key, that is, the random number key 102) is "1:2". The ramp type is a type in which the ratio between the random number and the plaintext can be changed, and in a case where the ratio between the random number and the plaintext is "(threshold−1):1", it is particularly referred to as perfect secret distribution.

First, it is assumed that there is a certain physical random number in the user [1] 107. Then, it is assumed that the user

[1] 107 executes distribution processing by the ramp-type secret distribution with the threshold 3, considering the physical random number as original data. Then, the user [1] 107 regards arbitrarily generated random numbers (random number key [1], random number key [2], and random number key [3]) as being obtained by this distribution. That is, the user [1] 107 does not actually generate the distributed data 106 by secret distribution here. Therefore, the distributed data 106 can be obtained by diverting the quantum key generated by the quantum key delivery function, and efficiency of the physical random number generation is improved. As described above, the present invention has features that are not included in data transfer using simple secret distribution. Note that the distributed data 106 may be generated by performing distribution processing on the random numbers (random number key [1], random number key [2], and random number key [3]) arbitrarily generated here by the secret distribution method. However, in this case, in the user [1] 107, in addition to the quantum key (physical random number) generated by the quantum key delivery function, a physical random number to be the original data also needs to be unnecessarily generated, and the efficiency of the physical random number generation deteriorates.

More specifically, the distribution processing of the ramp-type secret distribution of the threshold 3 will be described. First, the original data is distributed to the number of thresholds. For example, when the original data is "1 to 15", the original data is divided into "1, 4, 7, 10, and 13", "2, 5, 8, 11, and 14", and "3, 6, 9, 12, and 15". In FIG. 8, each group after distribution is represented by a row.

Subsequently, in generating three pieces of distributed data, a second row is shifted by one column for a distribution (2), a third row is shifted by one column for a distribution (3), and then, for example, convolution by the exclusive OR is executed for each of the distributions (1) to (3). Note that this convolution is not limited to the exclusive OR, and may be calculation by a polynomial, addition, subtraction, or the like.

When generating a random number, the user [1] 107 regards the random number as distributed data obtained by the above procedure (distribution processing by the ramp-type secret distribution with the threshold 3). That is, the user [1] 107 generates a plurality of random number sequences (random number key [1], random number key [2], and random number key [3]), and regards each random number sequence as distributed data. The user [1] 107 distributes the random number (distributed data 106) to another route for each random number sequence and transfers the random number to the user [2] 115.

FIG. 9 is a second diagram illustrating an example of a method of generating a random number key 102 by the user [1] 107 in the encryption communication system of the first embodiment.

The user [1] 107 uses the three pieces of distributed data 106 (actually, simple random numbers) 20 to execute restoration processing by the ramp-type secret distribution (this example is the (threshold K=3, L=2, and distribution number N=3) ramp-type secret distribution) with the distribution number 3 and the threshold 3 ("calculation" in FIG. 9). By this restoration, the above-described original data "1 to 15" of the hypothetical physical random number is obtained.

Note that when the restoration processing is executed in this manner without executing the distribution processing by the secret distribution method, data (original data) of a partial layer (row) of a part of the distributed data causes inconsistency (when all the distributed data are restored to the original data, the original data does not match in some distributed data). In order not to cause inconsistency, it is only required to regard that another random number (x1 to x5) is XORed to some distributed data. This may be considered as being shared in advance between the user [1] 107 and the user [2] 115. Note that when it is determined in advance or dynamically from which distributed data the original data is generated between the user [1] 107 and the user [2] 115, at least the original data generated in the user [1] 107 and the user [2] 115 match, and thus this inconsistency does not cause a problem. Note that, although there is some inconsistency, the physical random numbers (random number key [1], random number key [2], and random number key [3]) are regarded as distributed data, and the restoration processing by the secret distribution method is executed, thereby sufficiently securing the security.

Here, since it is assumed that the ratio between the random number and the plaintext is "1:2", the user [1] 107 removes, for example, "1, 4, 7, 10, and 13" (for one predetermined row) from the restored original data "1 to 15" as dummy data (physical random numbers to be discarded), and extracts "2, 3, 5, 6, 8, 9, 11, 12, 14, and 15" (for two predetermined rows), thereby generating the random number key 102.

In a case of the perfect secret distribution, since the ratio between the random number and the plaintext is the "threshold−1:1" ("2:1"), for example, the user [1] 107 removes "1, 2, 4, 5, 7, 8, 10, 11, 13, and 14" (for two predetermined rows) as dummy data (physical random numbers to be discarded) and extracts "3, 6, 9, 12, and 15" (for one predetermined row), thereby generating the random number key 102.

On the other hand, the user [2] 115 who has received the distributed data 106 from the user [1] 107 also performs the same calculation as that of the user [1] 107 to generate the random number key 102. The random number key 102 generated by the user [1] 107 and the random number key 102 generated by the user [2] 115 are the same. In other words, the random number key 102 is the random number key 102 shared between the user [1] 107 and the user [2] 115.

FIG. 10 is a diagram illustrating an example of encryption of the plaintext data 101 in the user [1] 107.

In the user [1] 107, the encryption data 103 is obtained by calculating random number key 102 XOR plaintext data 101.

As described above, the encryption communication system of the first embodiment delivers a plurality of pieces of distributed data 106 (actually, simple random numbers) which are regarded as distributed by the ramp-type secret distribution method, so that even when an unauthorized eavesdropper intrudes into one of the nodes that transmit and receive the distributed data 106 to and from the user and steals a part of the distributed data 106, the information of the random number key 102 is not leaked. Therefore, even a part of the encryption data 103 communicated between the user [1] 107 and the user [2] 115 over the Internet network 105 cannot be decrypted.

As described above, in the encryption communication system of the first embodiment, on the premise of the restoration processing by the secret distribution method between users, the plurality of pieces of distributed data 106 necessary for generating the random number key 102 are distributed to a plurality of nodes and sent to the quantum encryption communication network 120, and the plurality of pieces of distributed data 106 are received from the plurality of nodes of the quantum encryption communication network 120 and the random number key 102 (common key) is shared. Therefore, even when an unauthorized eavesdropper intrudes into one node that transmits and receives the distributed data 106 to and from a user and steals a part of the plurality of pieces of distributed data 106 necessary for generating the random number key 102, the unauthorized eavesdropper cannot decrypt the random number key 102, thereby maintaining the security of communication of the user.

By the way, in the above description, on the assumption of existence of certain original data, the restoration by the ramp-type secret distribution with the distribution number 3 and the threshold 3 is executed, and when the ratio between the random number and the plaintext is "1:2", one row (out of three rows) is removed as a random number (dummy data) from the data obtained by the restoration, and data for two rows is used as the random number key 102. Here, when the information theoretical safety is given up, all of the data obtained by the restoration can be used as the plaintext (random number key 102), or not all for one row but only a part of the row can be used as a random number. Even in this case, although the information theoretical safety cannot be secured, the number of combinations of operators for obtaining the original data is enormous, thereby sufficiently securing the security of the encryption communication of the user. Then, in this case, the consumption of the random number can be greatly reduced. Therefore, a transfer rate is also improved accordingly.

In a case where the threshold is 2, in order to secure the information theoretical safety, the ratio between the random number and the plaintext is only "1:1". However, as described above, when the information theoretical safety is given up, all the data obtained by the restoration can be used as the plaintext, or not all of one row (out of two rows) but only a part of the row can be used as the random number. Even in this case, although the information theoretical safety cannot be secured, the number of combinations of operators for obtaining the original data is enormous, thereby sufficiently securing the security of the encryption communication of the user. Therefore, the consumption of the random number can be greatly reduced. Note that, here, in order to simplify the description, the secret distribution methods of FIGS. 8 and 9 have been described. However, the available secret distribution method is not limited to this, and for example, a secret distribution method using another exclusive OR, a secret distribution method using a polynomial, or the like can be used.

Second Embodiment

Next, a second embodiment will be described.

In the encryption communication system of the first embodiment, one of two users who executes encryption communication generates a plurality of random numbers as distributed data 106, regards the plurality of random numbers as data distributed and generated by the secret distribution method, and executes restoration processing by the secret distribution method to acquire the random number key 102. In addition, the one of the two users distributes the plurality of pieces of distributed data 106 to a plurality of nodes and sends the distributed data to the quantum encryption communication network 120 toward the other of the two users. On the other hand, the other of the two users receives the plurality of pieces of distributed data 106 from the plurality of nodes, executes restoration processing by the secret distribution method, and acquires the random number key 102.

On the other hand, in the encryption communication system of the second embodiment, one of two users who executes the encryption communication generates a plurality of random numbers as the distributed data 106, then regards the plurality of random numbers as data distributed and generated by the secret distribution method, and generates the random number key 102 by superimposing the random numbers by the exclusive OR or the like instead of executing the restoration processing by the secret distribution method. On the other hand, the other of the two users also generates the random number key 102 by superimposing the plurality of pieces of distributed data 106 received from the plurality of nodes of the quantum encryption communication network 120 by the exclusive OR or the like. Note that the superposition may use a large number of other methods, for example, addition and subtraction, instead of or together with the exclusive OR.

Even in this case, as compared with the encryption communication system of the first embodiment, although there is no redundancy of communication (a distribution number is made larger than a threshold), on the premise of superposition such as an exclusive OR among the users, the plurality of pieces of distributed data 106 necessary for generating the random number key 102 are distributed to a plurality of nodes and sent to the quantum encryption communication network 120, and the plurality of pieces of distributed data 106 are received from the plurality of nodes of the quantum encryption communication network 120 and the random number key 102 (common key) is shared. Therefore, even when an unauthorized eavesdropper intrudes into one node that transmits and receives the distributed data 106 to and from the user and steals a part of the plurality of pieces of distributed data 106 necessary for generating the random number key 102, the unauthorized eavesdropper cannot decrypt the random number key 102, thereby maintaining the security of communication of the user.

FIG. 11 is a diagram illustrating an example of a method of generating the random number key 102 and encryption of the plaintext data 101 in the encryption communication system of the second embodiment.

Here, it is assumed that the generated two random number keys (distributed data 106) are a random number key [1] and a random number key [2], respectively. In the user (user [1] 107) on a transmission side, the random number key 102 is obtained by calculating random number key [1] XOR random number key [2]. Further, in the user [1] A11, the encryption data 103 is obtained by calculating random number key 102 XOR plaintext data 101.

Note that, in the user (user [2] 115) on a reception side, the random number key 102 is obtained by calculating random number key [1] XOR random number key [2]. Then, in the user [2] 115, the plaintext data 101 is obtained by calculating random number key 102 XOR encryption data 103.

As described above, in the encryption communication system of the second embodiment, since the random number key 102 is generated by superimposing the plurality of pieces of distributed data 106 by the Barnum encryption, even when an unauthorized eavesdropper intrudes into one node that transmits and receives the distributed data 106 to and from the user and steals a part of the distributed data 106, even a part of the encryption data 103 communicated by the two users over the Internet network 105 cannot be decrypted.

As described above, also in the encryption communication system of the second embodiment, the plurality of pieces of distributed data 106 necessary for generating the random number key 102 are distributed to the plurality of nodes and sent to the quantum encryption communication network 120 on the premise of the superposition such as an exclusive OR between the users, and the plurality of pieces of distributed data 106 are received from the plurality of nodes of the quantum encryption communication network 120 and the random number key 102 (common key) is shared. Therefore, even when an unauthorized eavesdropper intrudes into one node that transmits and receives the distributed data 106 to and from the user and steals a part of the plurality of pieces of distributed data 106 necessary for generating the random number key 102, the unauthorized eavesdropper cannot decrypt the random number key 102, thereby maintaining the security of communication of the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption communication system comprising:
a first device and second device that execute encryption communication via a first network, the first device and the second device sharing an encryption key used for the encryption communication via a second network including a plurality of nodes, wherein
the first device is configured to
generate n pieces of first data used for generating the encryption key, the n pieces of first data being random numbers,
transmit the n pieces of first data to the second device by distributing the n pieces of first data to n nodes among the nodes and sending the n pieces of first data to the second network, and
obtain second data using the generated n pieces of first data by restoration processing by a secret distribution method, and generate the encryption key based on the second data, the generated n pieces of first data, which are random numbers, being regarded as distributed data,
the second device is configured to
receive the n pieces of first data from n nodes among the nodes, and
obtain the second data using the generated n pieces of first data by restoration processing by the secret distribution method, and generate the encryption key based on the obtained second data, the generated n pieces of first data, which are random numbers, being regarded as distributed data.

2. The encryption communication system of claim 1, wherein:
transmission and reception of the first data between the nodes are executed via a first communication device included in each of the nodes;
transmission and reception of the first data between the first device or the second device and a node coupled to the first device or the second device among the nodes are executed via a second communication device included in each of the first device, the second device, and the node coupled to the first device or the second device; and
the node coupled to the first device or the second device is configured to internally execute exchange of the first data between the first communication device and the second communication device.

3. The encryption communication system of claim 1, wherein the secret distribution method is a ramp-type secret distribution method.

4. The encryption communication system of claim 1, wherein the first device and the second device are configured to generate the encryption key by superimposing the n pieces of first data.

5. The encryption communication system of claim 4, wherein the superimposition of the n pieces of first data is to calculate an exclusive OR of the n pieces of first data.

6. The encryption communication system of claim 1, wherein:
the second network has a configuration in which the nodes are coupled by an optical fiber; and
each of the nodes are configured to transmit and receive data to and from an adjacent node over the second network by photons using the optical fiber as a medium.

7. An encryption communication apparatus that executes encryption communication with another encryption communication apparatus via a first network, the encryption communication apparatus sharing an encryption key used for the encryption communication with the another encryption communication apparatus via a second network including a plurality of nodes, the apparatus comprising:
a first device configured to generate n pieces of first data used for generating the encryption key, the n pieces of first data being random numbers;
a second device configured to transmit the n pieces of first data to the another encryption communication apparatus by distributing the n pieces of first data to n nodes among the nodes and sending the n pieces of first data to the second network; and
a third device configured to obtain second data using the generated n pieces of first data by restoration processing by a secret distribution method, and generate the encryption key based on the second data, the generated n pieces of first data, which are random numbers, being regarded as distributed data.

8. An encryption communication method in which a first device and a second device that execute encryption communication via a first network share an encryption key used for the encryption communication via a second network including a plurality of nodes, the method comprising:
by the first device,
generating n pieces of first data used for generating the encryption key, the n pieces of first data being random numbers,
transmitting the n pieces of first data to the second device by distributing the n pieces of first data to n nodes among the nodes and sending the n pieces of first data to the second network, and
obtaining second data using the generated n pieces of first data by restoration processing by a secret distribution method, and generating the encryption key based on the second data, the generated n pieces of first data, which are random numbers, being regarded as distributed data; and
by the second device,
receiving the n pieces of first data from the n nodes among the nodes, and obtaining the second data using the generated n pieces of first data by restoration processing by the secret distribution method, and generating the encryption key based on the obtained second data, the generated n pieces of first data, which are random number, being regarded as distributed data.

* * * * *